Jan. 6, 1959   E. SARABIA MANDL   2,867,448
FOLDABLE SEAT, CHIEFLY A BABY-CAR
Filed Jan. 29, 1958   2 Sheets-Sheet 1

Inventor
ENRIQUE SARABIA MANDL

Jan. 6, 1959   E. SARABIA MANDL   2,867,448
FOLDABLE SEAT, CHIEFLY A BABY-CAR
Filed Jan. 29, 1958   2 Sheets-Sheet 2
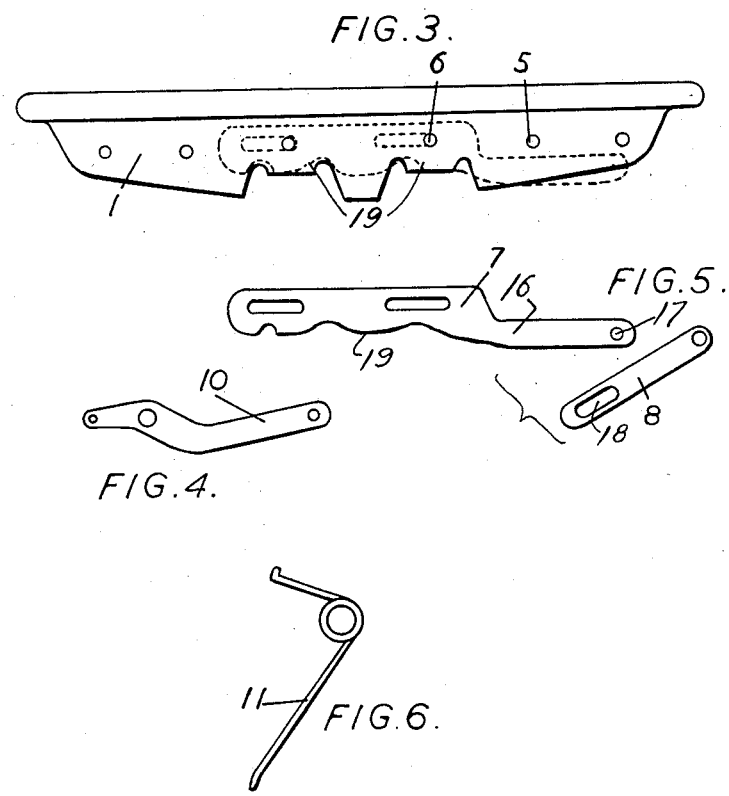
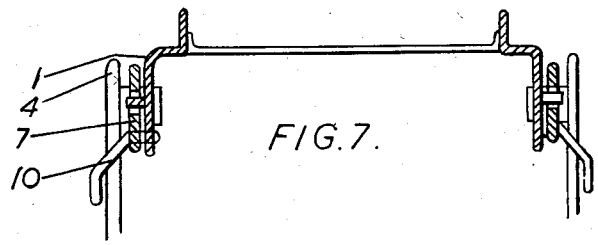
Inventor
ENRIQUE SARABIA MANDL
By

2,867,448

FOLDABLE SEAT, CHIEFLY A BABY-CAR

Enrique Sarabia Mandl, San Sebastian, Spain

Application January 29, 1958, Serial No. 711,876

Claims priority, application Spain February 4, 1957

5 Claims. (Cl. 280—36)

My invention has for its object improvements in baby-cars and the like foldable seats and it aims, more particularly, at producing means for folding and unfolding mechanically such baby-cars or the like seats.

According to my invention, I resort to a set of levers pivotally secured to the uprights of the baby-car and adapted to engage selectively different notches provided on members sliding over lateral members of the frame, said sliding members serving as bearings for the levers for ensuring the outward movement of the uprights into their collapsed position in alignment with the bottom of the actual seat. This provides for the complete downward collapsing movement of the wheeled vehicle, with a view to bringing the whole baby-car or the like seat substantially into a plane.

Accompanying drawings illustrate diagrammatically a preferred embodiment of my invention. In said drawings:

Figs. 3, 4 and 5 illustrate different component parts of the mechanism of the baby-car.

Fig. 6 illustrates the shape given to the compression spring equipping each upright so as to act through its ends for the return of the uprights into their operative position.

Fig. 7 is a transverse sectional view of the superposed members of the mechanism.

Figure 1:
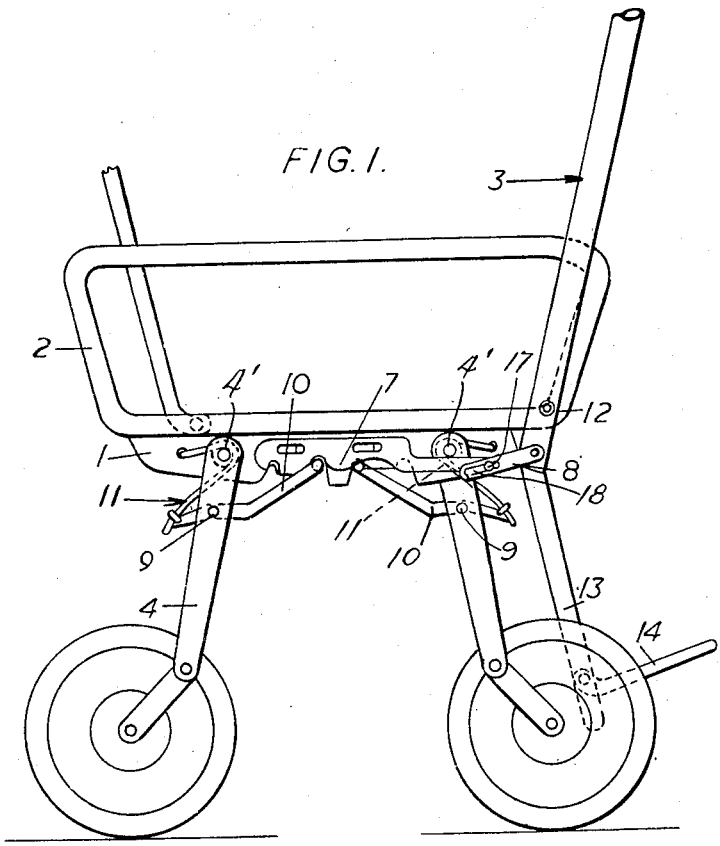
Fig. 1 illustrates the baby-car in its operative position, this elevational lateral view through the left-hand side being limited to a single section of the mechanism, which is quite sufficient for intelligence of the arrangement that is symmetrical.
Figure 2:
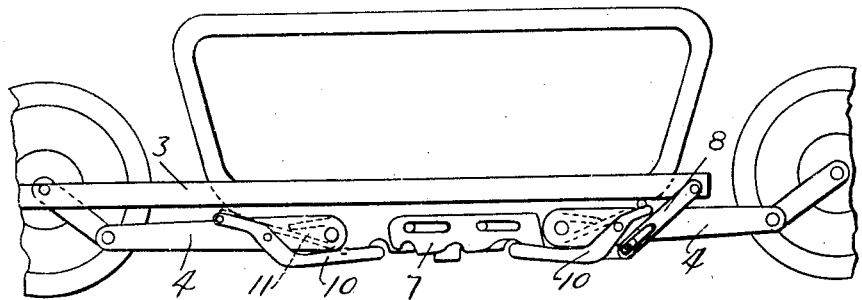
Fig. 2 is a similar view of the same baby-car in its folded or collapsed position for which it lies substantially in a plane.

As illustrated in the drawings, the arrangement includes a member 1 forming part of the frame and serving as a general support both for the actual seat or cradle 2 and for the back 3 forming a pivotal handle adapted to rock round the pivot or rivet 12, so as to occupy selectively an upright position (Fig. 1) or a horizontal position as shown in Fig. 2. To said support 1 are also secured at 4' the pivoting uprights 4 carrying the wheels and the remainder of the mechanism. As shown in elevational view in Fig. 3, the general shape and outline of said general supporting member 1 is provided along its lower outline with four notches and also with two openings 5 adapted to receive the pivots for the uprights and, furthermore, with two horizontally projecting pivots 6 guiding the slots provided horizontally in the sliding member 7, the general shape of which is that of a lever; the transverse cross-section of each supporting member 1 is shown in Fig. 7 and extends along a twice bent line somewhat after the manner of the digit 4, so as to provide the desired mechanical resistance.

The sliding member 7 is provided in addition to the two horizontal slots already referred to with three suitable notches or recesses forming a cam surface 19 along its lower edge and it terminates with the connecting lug 16 carrying a pivot 17 engaging a slot 18 formed in the auxiliary lever 8 and sliding in said slot; said auxiliary lever connects thus the slider with the lower end of the handle or back 3.

Turning to the actual uprights, each of them is pivotally secured at 9 to a further link member 10 adapted to rock round said point 9 and forming the guiding and actuating member during the opening or the closing movements of the uprights. Said link is given an oblique bent shape and carries a stud at each end, the upper stud being adapted to engage the notches in the lower edges of the slider, while the lower stud on said link holds inside a perforation formed therein the corresponding end of a steel spring 11 (Fig. 6) wound round the upper pivot carrying the upright 4 and the other end of which spring engages a point of the supporting member 1 for the chassis forming the seat 2.

The part played by said wound spring having two free ends consists in constraining the upright to return into its operative position which is slightly oblique as illustrated in Fig. 1. The fact that the upright includes two interconnected members allows obtaining a better damping or a better suspension as an auxiliary feature.

When the back or handle of the baby-car or the like vehicle is folded, and is shifted from its position illustrated in Fig. 1, into that illustrated in Fig. 2, as provided through a forwardly directed pivotal movement round the pivot 12 securing said back to the chassis, the lower end of the actual back describes an arcuate line towards the rear of the chassis and draws the lever 8 which shifts in its turn the slider 7 over the underside of the chassis. The movement of the sliding member 7 over the guiding pivots such as 6 towards the righthand side of Figs. 1 and 2 urges downwardly through its incurved edge the head of the link 10 which is thus constrained to move out of the groove or notch occupied by it precedingly.

As a consequence of the downward collapsing movement of the back or handle and of the release thus obtained for the retaining link 10, it is possible to exert a pressure on the baby-car or seat, so as to make it collapse into a flat condition. This is now possible by reason of the fact that the uprights are held in their operative stretched position solely under the action of the springs 11 and that the links slide over the underside of the chassis member 1 until their upper studs or pivots engage the corresponding notches in the latter, since the slider has been shifted now rearwardly out of engagement with the links. For such a collapsed condition, the links cannot return into their former position as long as their ends remain engaged with the said notches in the member 1 and are urged therein by the springs 11, as clearly shown in Fig. 2.

When the handle is raised again into its operative position, the slider 7 is shifted back into its starting position and releases the links 10 with reference to the notches engaged by them, so that the released links return the uprights into their operative positions under the action of the springs 11 which act now in the desired direction, as a consequence of the shifting of the ends of said springs attached to the links 10. This return of the uprights into their operative positions provides for the immediate possibility of using the baby-car or seat.

Lastly, the rearmost stem 13 carried by the back 3 and the step 14 rigid therewith allows when entering the position corresponding to the position of the car illustrated in Fig. 2 carrying said car or seat in a vertical position, whereby, the back being folded in the manner illustrated in Fig. 2, the stem 13 and the step thereon extend to the right-hand side of Fig. 2, as illustrated in dotted lines, beyond the corresponding rear wheels. Thus, the step 14 may serve as a handle through which it is possible to push the collapsed structure over the front wheels resting on the ground, without this requiring any substantial effort beyond the mere guiding of the collapsed structure.

What I claim is:

1. A collapsible wheeled seat, chiefly a baby-car comprising a body, a back pivotally secured to said body and adapted to be shifted between an upwardly directed position and a collapsed normally horizontal position, four wheeled uprights forming a front pair and a rear pair, independent transverse pivoting means for said uprights secured to the lower part of the body respectively at the front of said body for the front pair of uprights and at the rear of said body for the rear pair of uprights, a lever system operatively connected with the back, separate members mechanically independent of each other and of the back and controlled by the lever system upon a shifting of said back into a horizontal position, to urge the front uprights into a collapsed substantially horizontal position to the front of the body and the rear uprights into a collapsed substantially horizontal position to the rear of the body.

2. A collapsible wheeled seat, chiefly a baby-car, comprising a body, a back pivotally secured to said body and adapted to be shifted between an upwardly directed position and a collapsed normally horizontal position, four wheeled uprights, pivots for said uprights secured to the lower part of the body, a member slidingly carried by the underside of the body provided along its lower edge with a cam surface and adapted to be shifted longitudinally thereof, a lever pivotally secured to the lower end of the back, and a pin and slot connection between said lever and the rear end of the sliding member, a link pivotally secured to each upright and controlled by the corresponding cam section of the sliding member and adapted, upon collapsing of the back and consequent rearward shifting of the sliding member, to urge the front and rear uprights into positions for which they are collapsed into substantial alignment with the body of the car to the front and to the rear thereof respectively.

3. A collapsible wheeled seat, chiefly a baby-car, comprising a body the lower edge of which is provided with four notches, a back pivotally secured to said body and adapted to be shifted between an upwardly directed position and a collapsed normally horizontal position, four wheeled uprights, pivots for said uprights secured to the lower part of the body, a member slidingly carried by the underside of the body provided along its lower edge with a cam surface and adapted to be shifted longitudinally thereof, a lever pivotally secured to the lower end of the back, a pin and slot connection between said lever and the rear end of the sliding member, a link pivotally secured to each upright and controlled by the corresponding cam section of the sliding member and adapted to engage selectively two notches of the corresponding series of notches in the body, a spring wound round the pivot of each upright and the ends of which engage respectively the underside of the body and the end of the corresponding link, the position of said spring ends being such that the spring holds selectively the corresponding uprights in their collapsed positions and in their operative positions to either side of a neutral position, the shifting of each link under the action of the receding movement of the sliding member and of a downwardly directed thrust exerted on the body urging said links over the raised sections of the corresponding cam surfaces out of one notch and thence into the other cooperating notch in the lower edge of the body, the engagement of the links in such further notches providing for the collapsing of the wheeled uprights into a common plane.

4. A collapsible wheeled seat, chiefly a baby-car, comprising a body, a handle-shaped back pivotally secured to said body and adapted to be shifted between an upwardly directed position and a collapsed position in substantial registry with the lower surface of the body, four wheeled uprights adapted to be shifted out of their operative positions, a supporting member rigidly secured to the underside of the body and provided along its lower edge with two transverse recesses on the portion near each upright, pivots carried by said supports and round which the upper end of the corresponding upright is shiftable out of its operative position, a link pivotally secured to the upper end of each upright underneath its pivot and one end of which is adapted to engage selectively one of the two notches corresponding to the upright in the support for the operative and collapsed positions occupied by the upright respectively, a spring connecting the outer end of each link with the support and the medial section of which is wound round the pivot of the corresponding upright, said springs urging the uprights into their operative positions and a linkage operatively connected with the back and controlling the shifting of the links out of the position, corresponding to operativeness of the uprights against the action of the spring.

5. A collapsible wheeled seat, chiefly a baby-car, comprising a body, a handle-shaped back pivotally secured to said body and adapted to be shifted between an upwardly directed position and a collapsed position in substantial registry with the lower surface of the body, four wheeled uprights adapted to be shifted out of their operative positions, a supporting member rigidly secured to the underside of the body and provided along its lower edge with two transverse recesses on the portion near each upright, pivots carried by said supports and round which the upper end of the corresponding upright is shiftable out of its operative position, a link pivotally secured to the upper end of each upright underneath its pivot and one end of which is adapted to engage selectively one of the two notches corresponding to the upright in the support for operative and collapsed positions occupied by the upright respectively, a spring connecting the outer end of each link with the support and the medial section of which is wound round the pivot of the corresponding upright, said springs being adapted to hold the links and corresponding uprights selectively in their operative and inoperative positions to either side of a neutral position for which the pivot of the upright and the ends of the spring are in alignment, a member adapted to slide longitudinally over each side of the body between predetermined positions for which it urges selectively through its lower cam surface the different links out of the notches in the support corresponding to operativeness of the uprights and a linkage connecting operatively the back with each slider, pressure exerted upwardly on the uprights upon disengagement of the links with reference to last-mentioned notches urging the springs into positions beyond the said positions of alignment to set the uprights into their collapsed positions.

References Cited in the file of this patent

UNITED STATES PATENTS

| 1,204,791 | Kyle | Nov. 14, 1916 |

FOREIGN PATENTS

| 134,994 | Great Britain | Nov. 20, 1919 |
| 278,290 | Great Britain | Oct. 6, 1927 |